(12) United States Patent
Meyer et al.

(10) Patent No.: US 11,268,407 B2
(45) Date of Patent: Mar. 8, 2022

(54) TOOL FOR FIXING AN OUTER COLLAR OF AN INTERMEDIATE CASING OF A TURBOMACHINE

(71) Applicant: SAFRAN AIRCRAFT ENGINES, Paris (FR)

(72) Inventors: Julien Alain Meyer, Moissy-Cramayel (FR); Jérémie Nunge, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 302 days.

(21) Appl. No.: 16/037,964

(22) Filed: Jul. 17, 2018

(65) Prior Publication Data

US 2020/0025040 A1 Jan. 23, 2020
US 2021/0115814 A9 Apr. 22, 2021

(30) Foreign Application Priority Data

Jul. 20, 2017 (FR) ...................................... 1756892

(51) Int. Cl.
*F01D 25/28* (2006.01)

(52) U.S. Cl.
CPC ........ *F01D 25/285* (2013.01); *F05D 2230/68* (2013.01)

(58) Field of Classification Search
CPC .. F01D 25/243; F01D 25/285; F05D 2230/60; F05D 2230/68; Y10T 29/49998
See application file for complete search history.

(56) References Cited

U.S. PATENT DOCUMENTS

| | | | | |
|---|---|---|---|---|
| 4,562,631 A | * | 1/1986 | Welch ................... | B25B 27/023 29/259 |
| 6,883,224 B2 | * | 4/2005 | Thomas ................ | F01D 25/285 29/559 |
| 2003/0147742 A1 | | 8/2003 | Thomas | |

FOREIGN PATENT DOCUMENTS

DE 102015214665 A1 2/2017

OTHER PUBLICATIONS

Rapport de Recherche Préliminaire, mailed Mar. 27, 2018, issued in corresponding French Application No. 1756892, filed Jul. 20, 2017, 2 pages.

\* cited by examiner

*Primary Examiner* — Christopher J Besler
*Assistant Examiner* — Christine Bersabal
(74) *Attorney, Agent, or Firm* — Christensen O'Connor Johnson Kindness PLLC

(57) ABSTRACT

The present disclosure provides a tool for fixing an outer collar to a unit having at least one inner hub and a plurality of vanes. The tool includes a connecting interface with a lifting system and an attachment interface for the outer collar. The attachment interface includes a support surface configured to be supported on one face of a flange of the outer collar, a centering surface configured to be inserted into a hole of the flange, and at least one attachment element configured to attach the outer collar. The tool further includes a surface for centering the tool with respect to the unit, a surface for supporting the tool on the unit, and an actuator for adjusting the support surface with respect to the attachment interface.

13 Claims, 4 Drawing Sheets

TOOL FOR FIXING AN OUTER COLLAR OF AN INTERMEDIATE CASING OF A TURBOMACHINE

PRIORITY CLAIM

This application claims priority under 35 U.S.C. § 119 to French Patent Application No. 1756892, filed Jul. 20, 2017, which is herein incorporated by reference in its entirety.

TECHNICAL FIELD

Embodiments of the present disclosure relate to a tool to fix an outer collar of an intermediate casing of a turbomachine and a method for the fixation of the outer collar.

BACKGROUND

A propulsion system comprises a double-flow turbomachine which is integrated inside an outer annular casing. A turbomachine comprises for example, going from upstream to downstream in the direction of gas flow, a fan, a gas generator with one or more compressor stages, from low pressure and high pressure, a combustion chamber, one or more turbine stages, high pressure then low pressure, and an exhaust nozzle.

The outer casing particularly comprises a fan casing and an outer collar of an intermediate casing, fixed to one other.

The intermediate casing is, for example, situated longitudinally between the low-pressure compressor and the high-pressure compressor. The intermediate casing comprises an inner hub and an outer collar around the inner hub and forming, together with the latter, a portion of the secondary flow path. The outer collar is connected to the inner hub by a set of outlet guide vanes (OGVs) which are regularly distributed and substantially arranged radially with respect to the turbomachine's longitudinal axis.

Every OGV vane has an elongated, aerodynamically-shaped blade, longitudinally delimited by a leading edge upstream with respect to the direction of fluid flow in the intermediate casing, and by a trailing edge opposite to the leading edge. The blade is further delimited radially between an inner platform and an outer platform. The inner and outer platforms are respectively mounted on the inner hub and outer collar of the intermediate casing.

Conventionally, the outer collar of the intermediate casing is welded onto a unit comprising the inner hub onto which the OGV vanes have been mounted.

To fulfill the required geometric tolerances, upstream of the mounting of the outer collar, it is common to machine the outer platforms of OGV vanes, so-called "reference", mounted on the inner hub of the unit.

Such an assembly makes it possible to fulfill the required geometric tolerances, in particular the predetermined coaxiality tolerance between the outer collar and inner hub, as well as that the predetermined cylindricity tolerance associated with the outer collar. Meeting these tolerances is essential to guarantee the correct positioning of the fan casing and, consequently the respect of radial clearances required between the fan and the fan casing.

However, such an assembly is expensive and relatively inflexible. In addition, difficulties are encountered when an OGV vane subsequently has to be replaced, for example following an impact with a foreign body (a bird, hailstones, etc.).

To overcome the above-mentioned problems, in particular the machining step, a variant consists of bolting the OGV vanes onto collars while wedging the outer collar in position with respect to the inner hub. Thus, wedges of varying thicknesses are placed between each outer platform and the outer collar.

However, to implement such an alternative, it is necessary to have a tool to fix the outer collar, in particular a tool that makes it possible to meet the above-mentioned, desired geometric tolerances.

SUMMARY

Embodiments of the present disclosure aim to provide a tool for fixing the outer collar of an intermediate casing that makes it possible to meet, for example, the above-mentioned, desired geometric tolerances.

In one aspect, the present disclosure provides a tool for fixing an outer collar of an intermediate casing of a turbomachine to a unit comprising at least one inner hub and a plurality of outlet guide vanes for a secondary airflow, each of which comprising an inner platform fixed to the inner hub, and an outer platform intended to be fixed to the outer collar, the tool comprising:
  a connecting interface with a lifting system, so as to enable the movement of the tool;
  an interface for attachment of the outer collar to the tool, the attachment interface comprising:
  a support surface, configured to support on a face of a flange of the outer collar;
  a centering surface, configured to be inserted into a hole of the flange of the outer collar;
  at least one attachment element, configured to reversibly attach the outer collar to the tool when the support surface is supported on the face of the flange and the centering surface is inserted in the hole;
  means for centering the tool with respect to the unit;
  means for supporting the tool on the unit;
  means for adjusting the position of the support means with respect to the attachment interface.

Such a tool, for example, enables fulfillment of the desired geometric tolerances, namely the predetermined coaxiality tolerance between the outer collar and inner hub, as well as the predetermined cylindricity tolerance associated with the outer collar.

Meeting these tolerances thus enables guaranteeing the correct positioning of the fan casing and, consequently, ensuring the correct radial clearances required between the fan and the fan casing. Meeting these tolerances also enables guaranteeing the correct positioning of the interfaces for the fixation of tie bars to the axle and the adhering to the shapes situated on the exterior rim of the outer collar (for example, the grooves).

The tool may have one or more of the following characteristics, with any of them either taken alone or in combination:
  the support surface and the centering surface are formed in a shouldered ring added on a frame of the tool;
  the attachment element comprises a base fixed with respect to the frame and a jaw mobile with respect to the base;
  the support surface is flat and annular, and the centering surface is cylindrical;
  the frame comprises:
  a crown on which is added the shouldered ring;
  at least three connecting elements defining the connecting interface, the connecting elements being opposite to the crown and regularly distributed according to in a profile with a center of symmetry;

the tool comprises four connecting elements regularly distributed according to a square profile;

the adjustment means comprise a linear actuator comprising a body fixed with respect to the attachment interface and an internal member mobile with respect to the body, the support means being connected to the member.

the centering means comprise a guidance surface configured to center the tool with respect to the unit;

the guidance surface is defined by the body of the actuator.

In another aspect, the present disclosure provides a method for fixing an outer collar of an intermediate casing of a turbomachine to a unit comprising at least one inner hub and a plurality of outlet guide vanes for a secondary airflow, each of which comprising an inner platform fixed to the inner hub, and an outer platform intended to be fixed to the outer collar, by a tool such as defined above, the method comprising:

a step wherein the tool supporting the outer collar is lifted up;

a step wherein the tool is centered with respect to the unit;

a step wherein the outer collar is positioned for fixation to the unit;

a step wherein the outer collar is wedged with respect to the unit;

a step wherein the outer collar is fixed to the unit;

wherein, during the lifting, centering, positioning, wedging and fixation steps, a support surface of the tool supports one face of a flange of the outer collar, a centering surface of the tool is inserted in a hole of the flange of the outer collar, and the outer collar is held in the tool by means of at least one attachment element.

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

DESCRIPTION OF THE DRAWINGS

The foregoing aspects and many of the attendant advantages of the claimed subject matter will become more readily appreciated as the same become better understood by reference to the following detailed description, when taken in conjunction with the accompanying drawings, wherein:

DETAILED DESCRIPTION

The detailed description set forth below in connection with the appended drawings, where like numerals reference like elements, is intended as a description of various embodiments of the disclosed subject matter and is not intended to represent the only embodiments. Each embodiment described in this disclosure is provided merely as an example or illustration and should not be construed as preferred or advantageous over other embodiments. The illustrative examples provided herein are not intended to be exhaustive or to limit the claimed subject matter to the precise forms disclosed.

In the following description, specific details are set forth to provide a thorough understanding of exemplary embodiments of the present disclosure. It will be apparent to one skilled in the art, however, that the embodiments disclosed herein may be practiced without embodying all of the specific details. In some instances, well-known process steps have not been described in detail in order not to unnecessarily obscure various aspects of the present disclosure. Further, it will be appreciated that embodiments of the present disclosure may employ any combination of features described herein.

The present application may also reference quantities and numbers. Unless specifically stated, such quantities and numbers are not to be considered restrictive, but exemplary of the possible quantities or numbers associated with the present application. Also in this regard, the present application may use the term "plurality" to reference a quantity or number.

Figure 1:
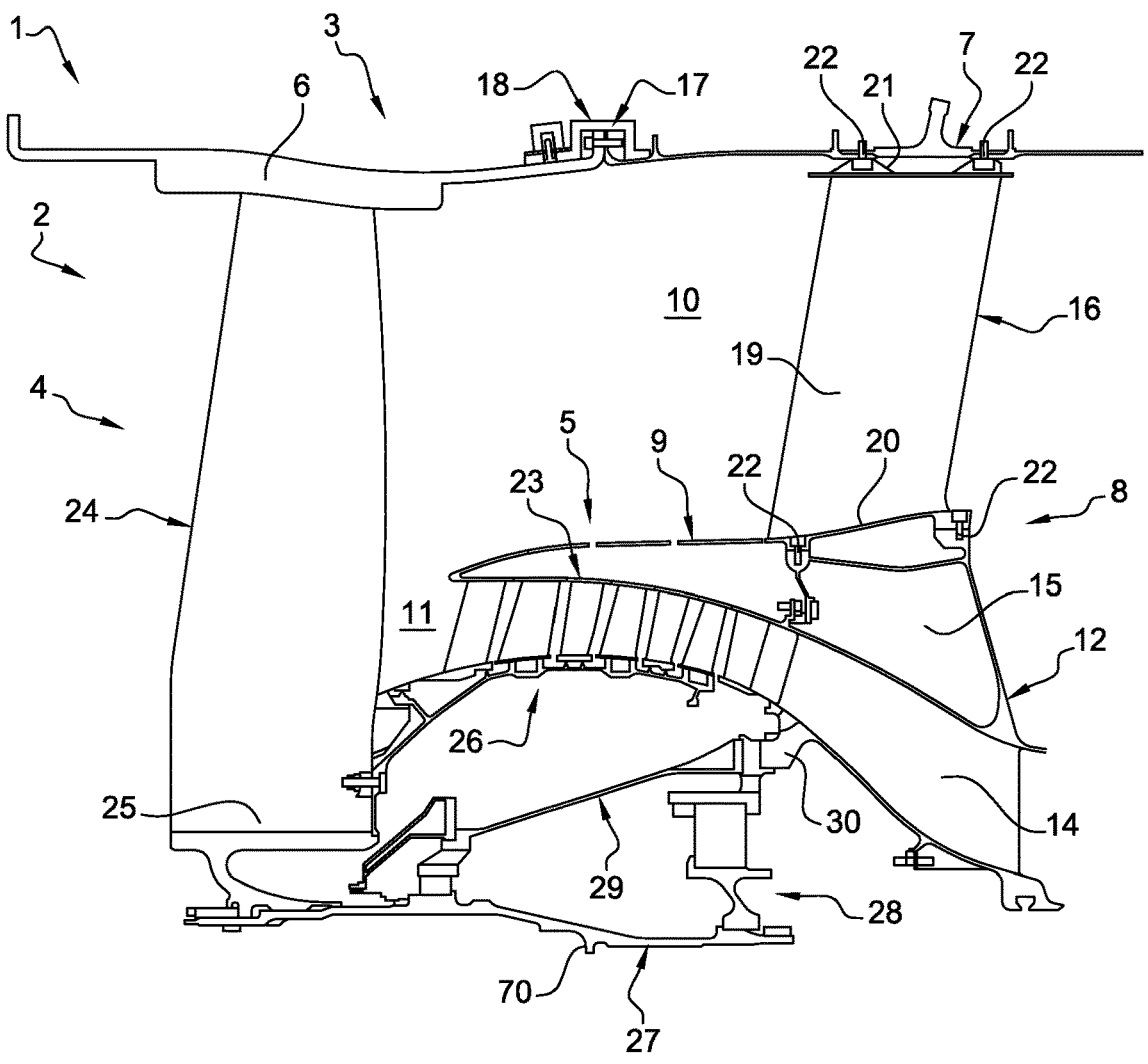
FIG. 1 is a longitudinal cross-sectional view of a turbomachine with an intermediate casing.

In FIG. 1, a propulsion system 1 is represented, in particular for an aircraft, comprising a double-flow turbomachine 2 which is integrated in an annular outer casing 3. The turbomachine 2 comprises, going from upstream to downstream in the direction of gas flow, a fan 4 and a gas generator comprising one or more compressor stages, low pressure 5 and high pressure, a combustion chamber, one or more turbine stages, high pressure then low pressure, and an exhaust nozzle.

The turbomachine 2 rotors are mobile in rotation around the longitudinal axis X of the turbomachine 2.

The outer casing 3 in particular comprises a fan casing 6 and the outer collar 7 of an intermediate casing 8, fixed to one another.

By convention, in this application, "longitudinal" and "longitudinally" mean any direction parallel to the axis X, and "radial" or "radially" mean any direction perpendicular to the axis X. Similarly, by convention, in this application, the terms "inner" and "outer" are defined radially with respect to the axis X. Finally, the terms "upstream" and "downstream" are defined with respect to the direction of gas flow in the propulsion system 1.

The air flow driven by the fan 4 is split by a lip of an inter-flow path structure 9 into a primary airflow entering in the gas generator of the turbomachine 2, and a secondary airflow that primarily contributes to the thrust provided by the turbomachine 2. The secondary airflow flows around the gas generator in a secondary flow path 10. The primary airflow flows through a primary flow path 11.

According to the embodiment illustrated in the FIGURES, in particular FIG. 1, the intermediate casing 8 is situated longitudinally between the low-pressure compressor 5 and the high-pressure compressor.

More specifically, the intermediate casing 8 comprises an inner hub 12 and an outer collar 7 extending around the inner hub 12 and forming, together with the latter, a portion of the secondary flow path 10. The inner hub 12 further comprises an annular opening 14 defining a portion of the primary flow path 11. The portion of the secondary flow path 10 is separated radially from the portion of the primary flow path 11 by an inter-flow path compartment 15 integrated into the inter-flow path structure 9, compartment 15 being, for example, intended for the passage of lines.

The outer collar 7 is connected to the inner hub 12 by OGV vanes 16 (substantially radial with respect to the longitudinal axis X of the turbomachine 2), and regularly distributed around the axis X. Some of these OGV vanes 16 are configured to support exterior forces and to form the framework of the intermediate casing 8, and in this regard, they are referred to as structural components. It is noted that such structural vanes are more commonly referred to as "arms".

Figure 2:
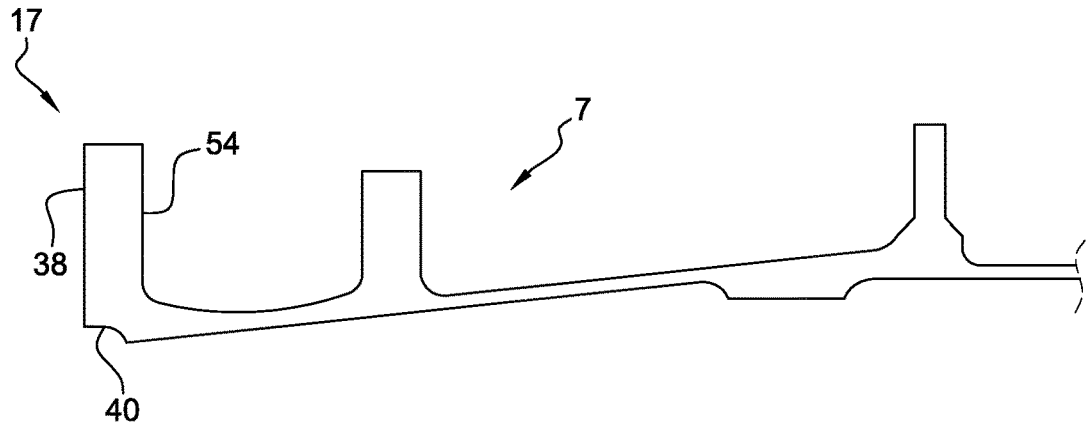
FIG. 2 is a longitudinal cross-sectional detailed view of an outer collar of the intermediate casing in FIG. 1.
Figure 3:
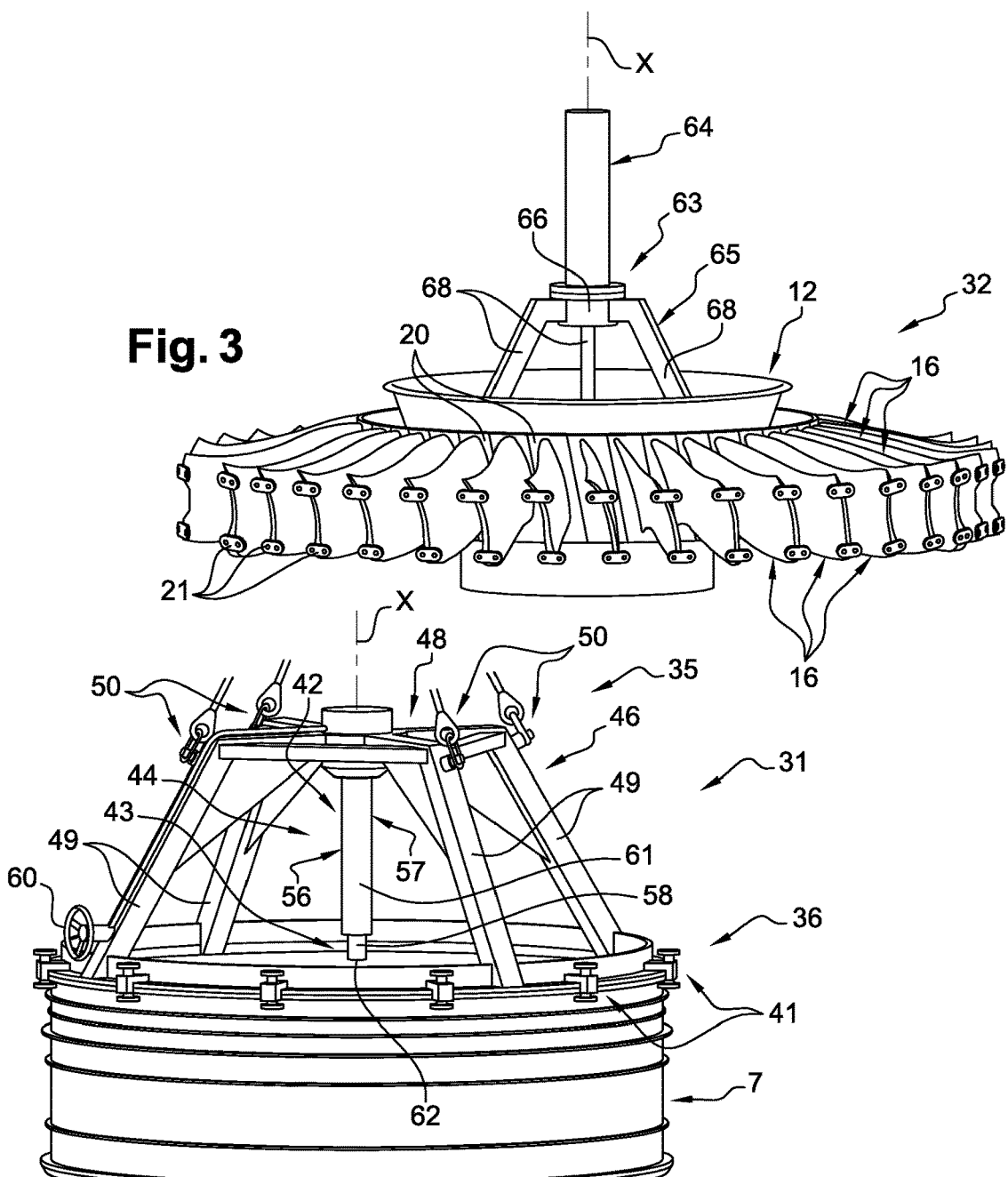
FIGS. 3 to 6 are perspective views of a method for fixing the outer collar of the intermediate casing onto a unit in a first mounting state.
Figure 4:
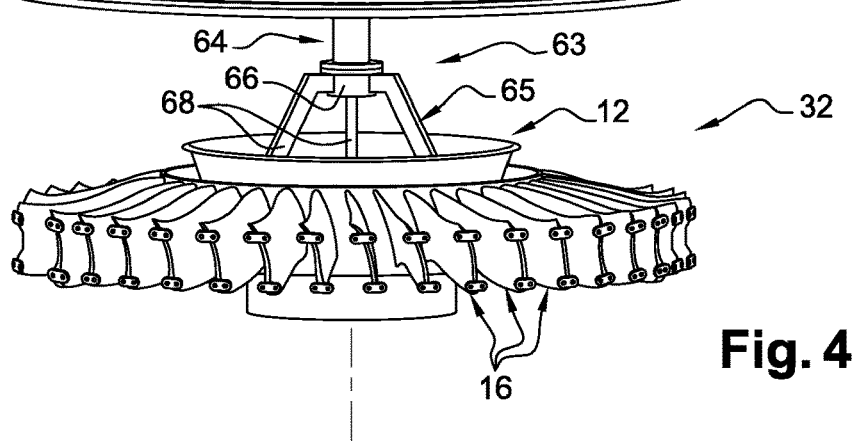

Such as illustrated in FIGS. 1 and 2, the intermediate casing 8 comprises an upstream flange 17 fixed to a downstream flange 18 on the fan casing 6 by a plurality of nuts that are regularly distributed around the axis X.

Every OGV vane comprises an elongated, aerodynamically-shaped blade 19, longitudinally delimited by a leading edge upstream with respect to the direction of gas flow in the intermediate casing 8, and by an trailing edge opposite to the leading edge. The blade 19 is further delimited radially between an inner platform 20 and an outer platform 21. The inner and outer platforms 20, 21 are respectively fixed to the inner hub 12 and outer collar 7 of the intermediate casing 8 with removable fixation components 22 (in this case, screws and/or nuts).

According to the embodiment illustrated in the FIGURES, and in particular FIG. 1, the portion of the inter-flow path structure 9 situated longitudinally upstream of the intermediate casing 8 in particular supports the stator 23 of the low-pressure compressor 5. The fan 4 comprises a plurality of vanes 24, each of which has an elongated, aerodynamically-shaped blade, radially delimited by a free outer end opposite the fan 6 casing and a foot fixed onto the fan 25 disc. The rotor 26 of the low-pressure compressor 5 is fixed onto the fan 25 disc. The fan 25 disc is connected in rotation to a shaft 27 of a bearing 28, the base 29 of which is fixed onto an annular collar 30 protruding from the inner hub 12.

On one or more assembly stations, the outer collar 7 of an intermediate casing 8 is fixed, using a tool 31, onto a unit 32, 33, 34 comprising at least the inner hub 12 and a plurality of OGV vanes 16. The outer collar 7 is flat-mounted, and in other words, the axis X is vertical, perpendicular to the floor or assembly stations.

In some embodiment, the tool 31 comprises at least:
one connecting interface 35 with a lifting system, so as to enable the movement of the tool 31;
an interface 36 for attachment of the outer collar 7 to the tool 31, the attachment interface 36 comprising:
a support surface 37, configured to support an upstream face 38 of the upstream flange 17 of the outer collar 7;
a centering surface 39, configured to be inserted into a hole 40 of the upstream flange 17 of the outer collar 7;
at least one attachment element 41 configured to reversibly attach the outer collar 7 to the tool 31 when the support surface 37 is in contact with the upstream face 38 of the upstream flange 17, and the centering surface 39 is inserted in the hole 40;
means 42 for centering the tool 31 with respect to the unit 32, 33, 34;
means 43 for supporting the tool 31 on the unit 32, 33, 34;
means 44 for adjusting the position of the support means 43 with respect to the attachment interface 36.

Figure 5:
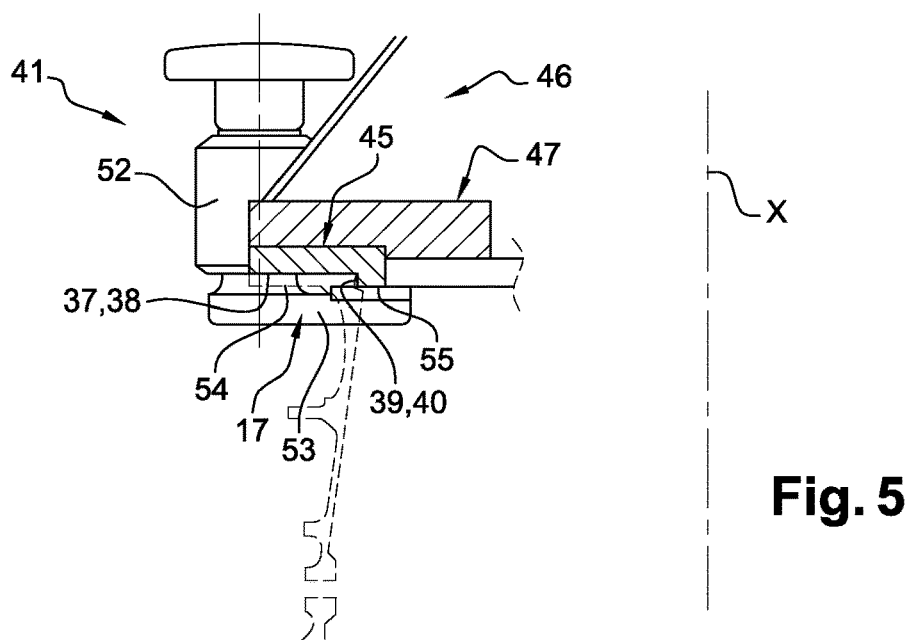

According to the embodiment illustrated in the FIGURES, and in particular FIG. 5, the support surface 37 of the attachment interface 36 is flat and annular, the centering surface 39 is cylindrical, and the support surface 37 is substantially perpendicular to the centering surface 39. The positioning of the outer collar 7 on the attachment interface 36 of the tool 31 (via the support surface 37 and centering surface 39) is thus formed through a flat support connection and short centering (isostatic positioning).

Such as illustrated in the FIGURES, the support surface 37 and centering surface 39 of the attachment interface 36 are formed by an shouldered ring 45 added on a frame 46 of the tool 31. The frame 46 is machine-welded on. The frame 46 comprises a lower crown 47 on which is added the shouldered ring 45 and an upper plate 48 connected to the crown 47 via four regularly distributed uprights 49. The crown 47 and plate 48 are ribbed. The crown 47 is centered on the axis X when the outer collar 7 is mounted on the attachment interface 36 of the tool 31.

Generally, to enhance the stability of the tool 31, the connecting interface 35 is defined by at least three connecting elements 50 that are regularly distributed along a flat profile with a center of symmetry, namely a profile that could be triangular, rectangular or lozenge, etc.

According to the embodiment illustrated in the FIGURES, the frame 46 comprises four lifting hands 50 defining the connecting interface 35 with the lifting system, each one of the lifting hands 50 being mounted on an upright 49 at the level of the upper plate 48 so as to form a square profile. The lifting hands 50 are intended to be hooked by the lifting system.

The lifting system, for example a winch, enables to move the outer collar 7 mounted on the tool 31 from a storage area up to the unit 32, 33, 34 on which the outer collar 7 is to be fixed. The lifting system is, for example, mounted mobile in translation on the assembly station(s) by a suspended bridge. The lifting system comprises, for example, a roll-out cable fitted with a lifting hook.

Such as illustrated in FIGS. 4 to 8, to move the tool 31, the lifting system comprises a sling comprising four strands 51, joined at one of the ends thereof through a ring engaged in the lifting hook. Each strand 51 has a hook at the free end thereof, configured to be connected to a lifting hand 50 of the connecting interface 35 on the tool 31.

Such as illustrated in FIGS. 4 to 8, the attachment interface 36 comprises twelve regularly distributed attachment elements 41. Each attachment element 41 comprises a base 52 added on the crown 47 of the frame 46, and a jaw 53 mobile with respect to the base 52. The jaw 53 is configured to be brought into contact with a downstream face 54 of the upstream flange 17 opposite the upstream face 38 of the upstream flange 17. To prevent damage to the downstream face 54 of the upstream flange 17, the jaw 53 is covered with a pad (for example, made of rubber). The jaw 53 can be tightened by hand using a handle.

In some embodiments, the adjustment means 44 comprises a linear actuator 56 comprising a fixed body 57 with respect to the attachment interface 36, and an internal member 58 mobile with respect to the body 57, the support means 43 being connected to the member 58.

Such as illustrated in FIGS. 4 to 8, the body 57 is added on a central base connected to the upper plate 48 through four arms 59 so as to form a star. The linear actuator 56 is a screw model 56. The member 58 moves forward vertically (along the axis X). Operatives can move the member 58 of the actuator 56 manually, using a crank 60 placed at the level of the crown. The rotatory movement generated by the crank 60 is transmitted to the actuator 56 through rods connected via universal joints and guided via bearings on the frame 46.

Such as illustrated in FIGS. 4 to 8, the centering means 42 in some embodiments comprise a guidance surface 61 configured to be used to center the tool 31 with respect to the unit 32, 33, 34. The guidance surface 61 is defined by the body 57 of the actuator 56 and is cylindrical, the guidance surface 61 being coaxial with the axis X.

Such as illustrated in FIGS. 4 to 8, the support means 43 in some embodiments comprise a supporting surface 62, configured to be used to support the tool 31 on the unit 32, 33, 34. The supporting surface 62 is defined by the free end of the member 58 and is presented here in the form of a disc, the supporting surface 62 being substantially perpendicular to the axis X.

The tool 31 is configured to enable the mounting of the outer collar 7 at various different mounting states.

According to a first mounting state illustrated in FIGS. 3 to 6, the unit 32 comprises the inner hub 12, at least eight OGV vanes 16 mounted on the inner hub 12 (all the OGV vanes 16 are advantageously mounted on the inner hub 12) and an adaptor 63. The adaptor 63 is removed after the outer collar 7 has been mounted on the unit 32.

Such as illustrated in FIGS. 3 to 6, the adaptor 63 comprises a sleeve 64 and a base 65. The base 65 comprises a plate 66 that connects with the sleeve 64 and a base 67 that connects with the collar 30 on the inner hub 12, the plate 66 and the base 67 being connected via three feet 68 that are regularly distributed around the axis X.

More specifically, the sleeve 64 is centered on X and comprises a bore configured to receive the guidance surface 61 of the centering means 42. The plate 66 internally comprises counterbored hole (centered on axis X) defining a shoulder to accommodate the support surface 62 of the support means 43. The base 67 is ring-shaped and supports the collar 30 of the inner hub 12. The base is centered with respect to the collar 30 (centered on X) via six centering pins 69.

Figure 7:
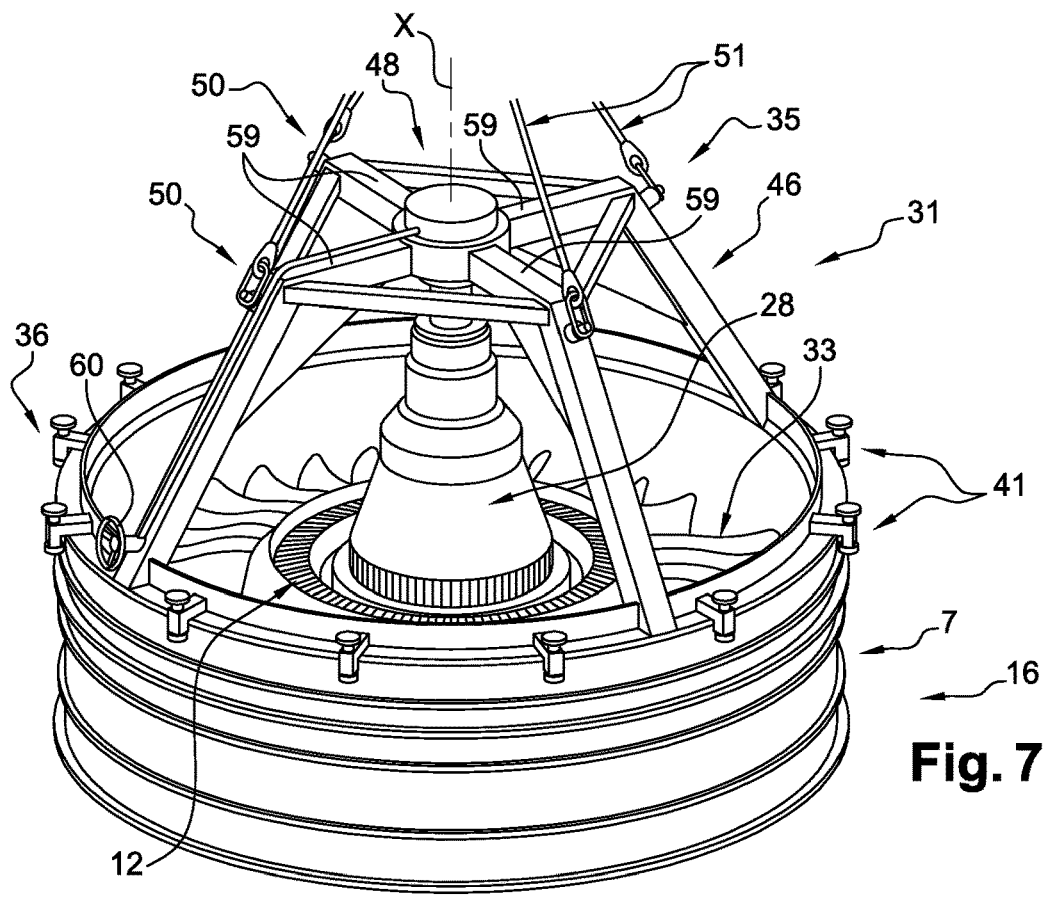
FIG. 7 is a perspective view of a method for fixing the outer collar of the intermediate casing onto a unit in a second mounting state.

According to a second mounting state illustrated in FIG. 7, the unit 33 comprises the inner hub 12, at least eight OGV vanes 16 mounted on the inner hub 12 (all the OGV vanes 16 are advantageously mounted on the inner hub 12) and the guidance bearing 28 of the fan 4 and the rotor 26 of the low-pressure compressor 5.

Figure 8:
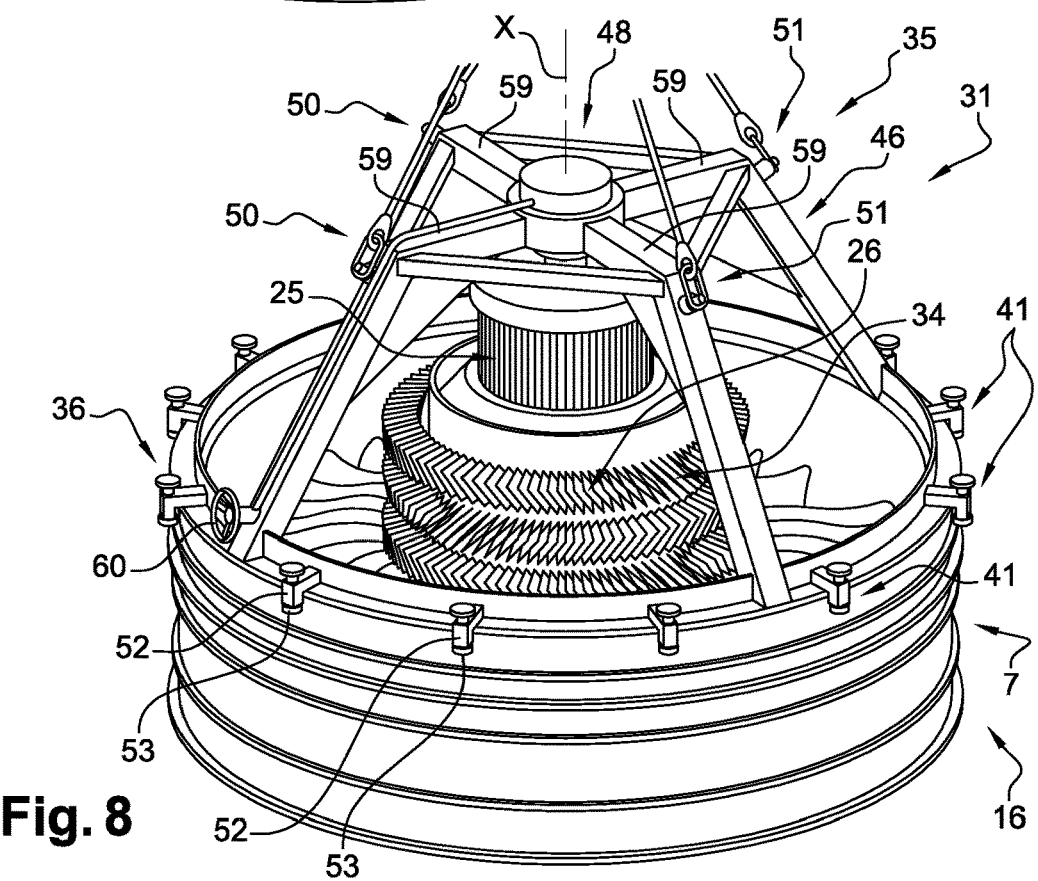
FIG. 8 is a perspective view of a method for fixing the outer collar of the intermediate casing onto a unit in a third mounting state.

According to a third mounting state illustrated in FIG. 8, the unit 34 comprises the inner hub 12, at least eight OGV vanes 16 mounted on the inner hub 12 (all the OGV vanes 16 are advantageously mounted on the inner hub 12), the bearing 28, the fan 25 disc and the rotor 26 of the low-pressure compressor 5.

The fixation of the outer collar 7 of the intermediate casing 8 on the unit 32, 33, 34 comprising at least one inner hub 12 and a plurality of OGV vanes 16 fixed on the inner hub 12 by means of the tool 31, is achieved according to a method comprising at least the following steps:

a step wherein the tool 31 supporting the outer collar 7 is lifted up;
a step wherein the tool 31 is centered with respect to the unit 32, 33, 34;
a step wherein the outer collar 7 is positioned for fixation to the unit 32, 33, 34;
a step in which the outer collar 7 is wedged with respect to the unit 32, 33, 34;
a step in which the outer collar 7 is fixed to the unit 32, 33, 34;

During the lifting, centering, positioning, wedging and fixation steps, the support surface 37 of the attachment interface 36 is supported on the upstream face 38 of the upstream flange 17, the centering surface 39 of the attachment interface 36 is inserted in the hole 40 on the upstream flange 17, and the outer collar 7 is held in the tool 31 by means of attachment elements 41.

According to the embodiment illustrated in the FIGURES, during the lifting step, the outer collar 7 mounted on the attachment interface 36 of the tool 31 is, in particular, lifted from the storage area thereof by the lifting system.

During the centering step, the guidance surface 61 of the tool 31 (e.g., centering means 42) is, in particular inserted into a housing of the unit 32, 33, 34 (here the bore into the adaptor 63 or the shaft 27 of the bearing) so as to center the tool 31 (and consequently the outer collar 7) with respect to the unit 32, 33, 34.

Figure 6:
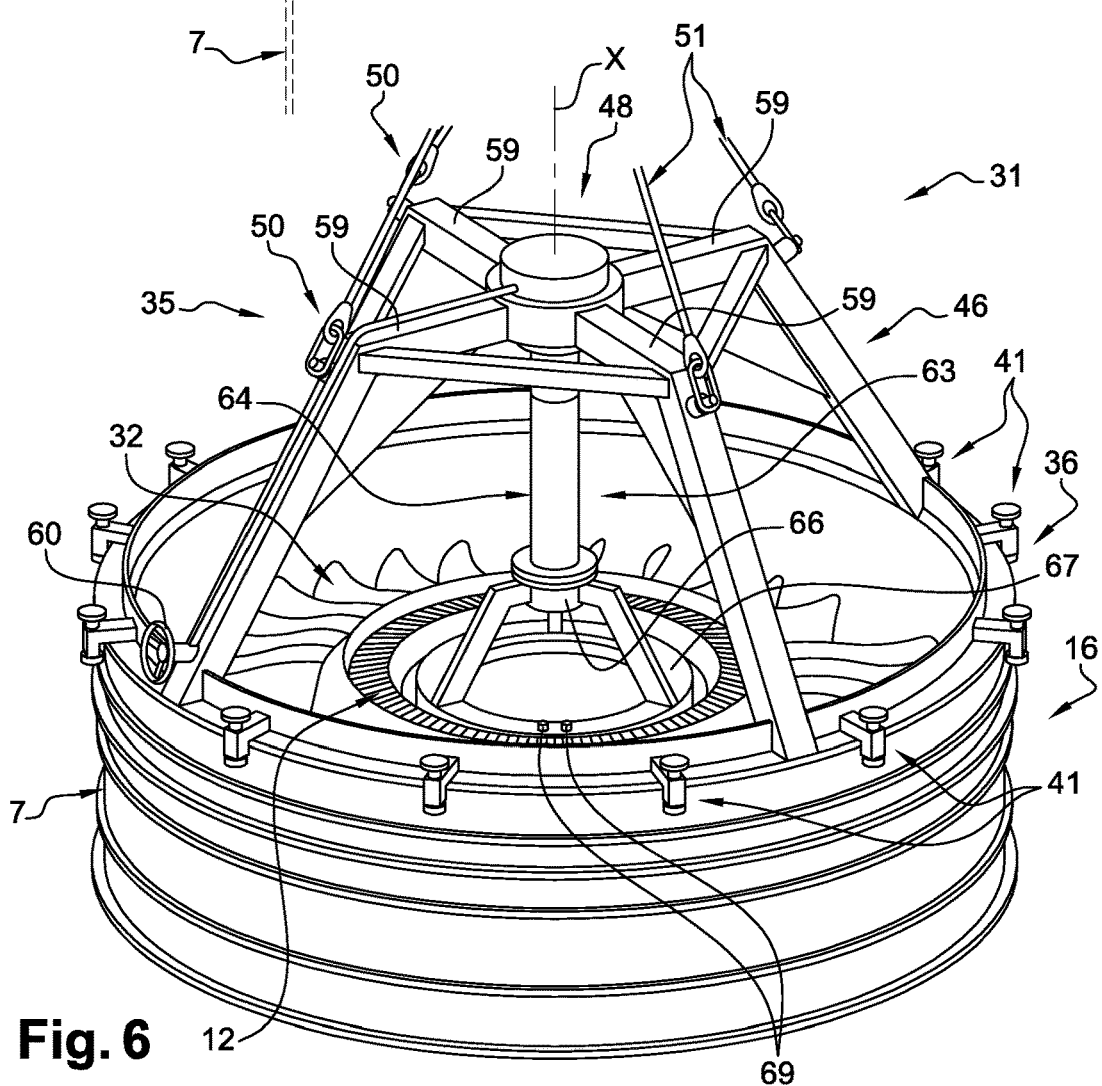

During the positioning step, the support surface 62 of the tool 31 (e.g., support means 43) is in particular supported on a stop of the unit 32, 33, 34 (here the shoulder of the plate 66 or a stop 70 produced on the shaft 27 of the bearing 28) so as to support the tool 31 on the unit 32, 33, 34. Then, the vertical position of the tool 31 (and consequently the outer collar 7) is adjusted using the crank 60, for example, actuated by an operative (subject to there is slack in the lifting system cable) so as to position the outer collar 7 in a position for fixation to the unit 32, 33, 34 (FIG. 6).

In the wedging step, wedges of variable thicknesses (for example from 0.8 mm to 2.2 mm) are inserted between each outer platform 21 and the outer collar 7 such that, the axis of the outer collar 7 will be positioned in a theoretical cylinder centered on the axis of the unit 32, 33, 34 and having a predetermined diameter defined by the coaxiality tolerance.

In the fixation step, the fixation elements 22 (in this case, screws and/or nuts) are implemented so as to fix the outer collar 7 to the unit 32, 33, 34.

The principles, representative embodiments, and modes of operation of the present disclosure have been described in the foregoing description. However, aspects of the present disclosure which are intended to be protected are not to be construed as limited to the particular embodiments disclosed. Further, the embodiments described herein are to be regarded as illustrative rather than restrictive. It will be appreciated that variations and changes may be made by others, and equivalents employed, without departing from the spirit of the present disclosure. Accordingly, it is expressly intended that all such variations, changes, and equivalents fall within the spirit and scope of the present disclosure, as claimed.

The embodiments of the invention in which an exclusive property or privilege is claimed are defined as follows:

1. A tool for fixing an outer collar of an intermediate casing of a turbomachine to a unit comprising at least one inner hub and a plurality of outlet guide vanes for a secondary airflow, each of which comprises an inner platform fixed to said inner hub, and an outer platform configured to be fixed to said outer collar, said tool comprising:
a connecting interface with a lifting system, so as to enable movement of said tool;
an attachment interface configured to attach said outer collar to said tool, said attachment interface comprising:
a support surface, configured to support a face of a flange of said outer collar;
a centering surface, configured to be inserted into a hole of said flange of said outer collar;
at least one attachment element, configured to reversibly attach said outer collar to said tool when said support surface is supported on said face of said flange and said centering surface is inserted in said hole;

means for centering said tool with respect to said unit;
  means for supporting said tool on said unit; and
means for adjusting a position of said support means with respect to said attachment interface,
wherein said support surface and said centering surface are formed in a shouldered ring added on a crown of a frame of said tool,
wherein said support surface, said centering surface, said shouldered ring, and said crown are coaxial.

2. The tool according to claim 1, wherein said at least one attachment element comprises a base fixed with respect to said frame, and a jaw mobile with respect to said base.

3. The tool according to claim 1, wherein said support surface is flat and annular, and said centering surface is cylindrical.

4. The tool according to claim 1, wherein said frame comprises:
  said crown on which is added said shouldered ring; and
  at least three connecting elements defining said connecting interface, said connecting elements being opposite to said crown and regularly distributed according to a profile with a center of symmetry.

5. The tool according to claim 4, wherein said tool comprises four connecting elements regularly distributed according to a square profile.

6. The tool according to claim 1, wherein said adjustment means comprise a linear actuator comprising a body fixed with respect to said attachment interface, and an internal member mobile with respect to said body, said support means being connected to said internal member.

7. The tool according to claim 6, wherein said centering means comprise a guidance surface, configured to center said tool with respect to said unit.

8. The tool according to claim 7, wherein said guidance surface is defined by said body of said linear actuator.

9. The tool according to claim 1, wherein said adjustment means comprise a linear actuator comprising a body fixed to a central base of said frame of said tool, and an internal member mobile with respect to said body, said support means being connected to said internal member, said centering means comprising a guidance surface which is defined by said body of said linear actuator, said body projecting from said central base toward said attachment interface.

10. The tool according to claim 1, wherein said connecting interface comprises at least three lifting hands, said at least three lifting hands being regularly distributed according to a profile with a center of symmetry.

11. A method for fixing an outer collar of an intermediate casing of a turbomachine to a unit comprising at least one inner hub and a plurality of outlet guide vanes for a secondary airflow, each of which comprising an inner platform fixed to said inner hub, and an outer platform intended to be fixed to said outer collar by a tool according to claim 1, the method comprising:
  lifting the tool supporting said outer collar; centering the tool with respect to said unit;
  positioning said outer collar for fixation to said unit; wedging said outer collar with respect to said unit; fixing said outer collar to said unit;
  wherein, during said lifting, centering, positioning, wedging and fixating, a support surface of said tool supports one face of a flange of said outer collar, a centering surface of said tool is inserted in a hole of said flange of said outer collar, and said outer collar is held in said tool by means of at least one attachment element.

12. A system, comprising: the tool of claim 1; and
  an outer collar of an intermediate casing of a turbomachine.

13. The system of claim 12, further comprising a unit comprising at least one inner hub and a plurality of outlet guide vanes for a secondary airflow, each of which comprises an inner platform fixed to said inner hub, and an outer platform configured to be fixed to said outer collar.

\* \* \* \* \*